United States Patent
Laing

(10) Patent No.: US 8,934,763 B2
(45) Date of Patent: Jan. 13, 2015

(54) WATER DELIVERY SYSTEM AND METHOD FOR MAKING HOT WATER AVAILABLE IN A DOMESTIC HOT WATER INSTALLATION

(75) Inventor: Oliver Laing, Stuttgart (DE)

(73) Assignee: Xylem IP Holdings LLC, White Plains, NY (US)

( * ) Notice: Subject to any disclaimer, the term of this patent is extended or adjusted under 35 U.S.C. 154(b) by 158 days.

(21) Appl. No.: 13/451,912

(22) Filed: Apr. 20, 2012

(65) Prior Publication Data

US 2013/0279891 A1    Oct. 24, 2013

(51) Int. Cl.
| | |
|---|---|
| A47J 31/00 | (2006.01) |
| F24H 1/08 | (2006.01) |
| B05B 1/24 | (2006.01) |
| B05B 7/22 | (2006.01) |
| B67D 7/80 | (2010.01) |
| F24H 1/10 | (2006.01) |
| H05B 3/78 | (2006.01) |
| H05B 1/02 | (2006.01) |
| H01C 7/02 | (2006.01) |
| A47J 27/62 | (2006.01) |

(Continued)

(52) U.S. Cl.
USPC ........... 392/466; 392/465; 392/471; 392/473; 392/474; 392/475; 392/478; 392/480; 392/481; 392/482; 392/485; 392/486; 392/498; 392/500; 392/502; 126/374.1; 431/331; 700/275; 700/282; 122/18.2; 122/40

(58) Field of Classification Search
CPC ........................................................ F24H 1/10
USPC ......... 392/466, 465, 471, 473, 474, 475, 478, 392/480, 481, 482, 485, 486, 498, 500, 502
See application file for complete search history.

(56) References Cited

U.S. PATENT DOCUMENTS

| | | | |
|---|---|---|---|
| 3,120,854 A | | 2/1964 | Shimooka |
| 3,597,588 A | * | 8/1971 | Kirschner et al. ............ 392/452 |

(Continued)

FOREIGN PATENT DOCUMENTS

| | | |
|---|---|---|
| DE | 36 19 217 | 12/1987 |
| DE | 197 12 051 | 9/1998 |

(Continued)

OTHER PUBLICATIONS

Grundfos Pumps Corporation, "The Wait is Over Hot Water in an Instant", Brochure, May 2005.

(Continued)

*Primary Examiner* — Dana Ross
*Assistant Examiner* — Gyounghyun Bae
(74) *Attorney, Agent, or Firm* — RatnerPrestia

(57) ABSTRACT

A water delivery system is provided, comprising at least one faucet device with a cold water faucet part and a hot water faucet part, a cold water line to the at least one faucet device, a tankless heater device for heating water, a hot water line having a first portion running from an outlet of the tankless heater device to the at least one faucet device and having a second portion running from the at least one faucet device to an inlet of the tankless heater device, and a circulatory pump arranged in the second portion of the hot water line, wherein the circulatory pump has a prefixed first performance level and a prefixed second performance level, wherein the first performance level causes a finite water flow in the hot water line which is below an operation threshold value of the tankless heater device.

21 Claims, 2 Drawing Sheets

(51) Int. Cl.
*F23D 5/02* (2006.01)
*G01M 1/38* (2006.01)

(56) References Cited

U.S. PATENT DOCUMENTS

| | | | |
|---|---|---|---|
| 3,805,836 A | 4/1974 | Veale | |
| 4,142,515 A | 3/1979 | Skaats | |
| 4,152,567 A * | 5/1979 | Mayfield | 219/688 |
| 4,201,518 A | 5/1980 | Stevenson | |
| 4,241,868 A | 12/1980 | Perkins | |
| 4,567,350 A * | 1/1986 | Todd, Jr. | 392/486 |
| 4,604,515 A * | 8/1986 | Davidson | 392/492 |
| 4,606,325 A | 8/1986 | Lujan, Jr. | |
| 4,697,614 A | 10/1987 | Powers et al. | |
| 4,750,472 A | 6/1988 | Fazekas | |
| 4,762,980 A * | 8/1988 | Insley | 392/494 |
| 4,808,793 A * | 2/1989 | Hurko | 392/489 |
| 4,936,289 A | 6/1990 | Peterson | |
| 4,945,942 A | 8/1990 | Lund | |
| 5,042,524 A | 8/1991 | Lund | |
| 5,277,219 A | 1/1994 | Lund | |
| 5,323,803 A | 6/1994 | Blumenauer | |
| 5,351,712 A | 10/1994 | Houlihan | |
| 5,775,372 A | 7/1998 | Houlihan | |
| 5,868,311 A * | 2/1999 | Cretu-Petra | 236/12.12 |
| 5,941,275 A | 8/1999 | Laing | |
| 5,944,221 A | 8/1999 | Laing et al. | |
| 5,983,922 A | 11/1999 | Laing et al. | |
| 6,026,844 A | 2/2000 | Laing et al. | |
| 6,039,067 A | 3/2000 | Houlihan | |
| 6,246,831 B1 * | 6/2001 | Seitz et al. | 392/486 |
| 6,389,226 B1 * | 5/2002 | Neale et al. | 392/485 |
| 6,536,464 B1 | 3/2003 | Lum et al. | |
| 6,895,985 B2 | 5/2005 | Popper et al. | |
| 7,055,466 B2 * | 6/2006 | Long | 122/40 |
| 7,073,528 B2 | 7/2006 | Kempf et al. | |
| 7,593,789 B2 * | 9/2009 | Gougerot et al. | 700/275 |
| 7,597,066 B2 * | 10/2009 | Shimada et al. | 122/18.1 |
| 7,773,868 B2 * | 8/2010 | Moore | 392/490 |
| 7,832,421 B2 | 11/2010 | Laing | |
| 8,498,523 B2 * | 7/2013 | Deivasigamani et al. | 392/308 |
| 2004/0182439 A1 | 9/2004 | Popper et al. | |
| 2006/0016902 A1 | 1/2006 | Restivo, Sr. et al. | |
| 2006/0162719 A1 * | 7/2006 | Gougerot et al. | 126/374.1 |
| 2006/0289065 A1 | 12/2006 | Adams | |
| 2007/0137709 A1 | 6/2007 | Kempf et al. | |
| 2008/0105305 A1 | 5/2008 | Lum et al. | |
| 2008/0160470 A1 * | 7/2008 | Holtan et al. | 431/331 |
| 2008/0230126 A1 | 9/2008 | Acker | |
| 2009/0092384 A1 * | 4/2009 | Luo et al. | 392/488 |
| 2009/0110379 A1 * | 4/2009 | McGhin et al. | 392/485 |
| 2010/0092164 A1 * | 4/2010 | Ziehm | 392/485 |
| 2010/0096018 A1 * | 4/2010 | Wylie et al. | 137/2 |
| 2010/0195991 A1 * | 8/2010 | Deivasigamani et al. | 392/308 |
| 2010/0198417 A1 * | 8/2010 | Deivasigamani et al. | 700/282 |
| 2010/0209084 A1 * | 8/2010 | Nelson et al. | 392/465 |
| 2011/0214767 A1 | 9/2011 | Laing | |
| 2011/0311209 A1 * | 12/2011 | Bhardwaj et al. | 392/451 |
| 2012/0057857 A1 * | 3/2012 | Kenney et al. | 392/465 |
| 2013/0284116 A1 * | 10/2013 | Deivasigamani et al. | 122/14.21 |
| 2013/0284117 A1 * | 10/2013 | Deivasigamani et al. | 122/18.1 |
| 2014/0023352 A1 * | 1/2014 | Jurczyszak et al. | 392/466 |
| 2014/0229022 A1 * | 8/2014 | Deivasigamani et al. | 700/282 |

FOREIGN PATENT DOCUMENTS

| | | |
|---|---|---|
| DE | 100 24 803 | 11/2000 |
| JP | 54129542 A | 10/1979 |
| JP | 2006145182 A | 6/2006 |
| WO | WO9843143 | 10/1998 |

OTHER PUBLICATIONS

Act, Inc., Metlund Systems "Metlund Hot Water Demand System, Hot Water at the Push of a Button", Brochure (2010).

Silicon Labs, Si4421 Universal ISM Band FSK Transceiver, Brochure (2010).

Laing Thermotech, Inc. "How Hot Water Recirculating Systems Work," http://www.lainginc.com/howhot.htm (2001).

Laing Thermotech, Inc., "Laing Autocirc—How the Autocirc System Works," http://www.autocirc.com/Autocirc.htm (2001).

Laing Thermotech, Inc. , "Installation and Operating Manual," (2002).

Laing Thermotech, Inc., "Hot Water Recirculation—How it Works," www.grundfos.com (2003).

US Office Action for U.S. Appl. No. 12/718,538 dated Jun. 20, 2014.

* cited by examiner

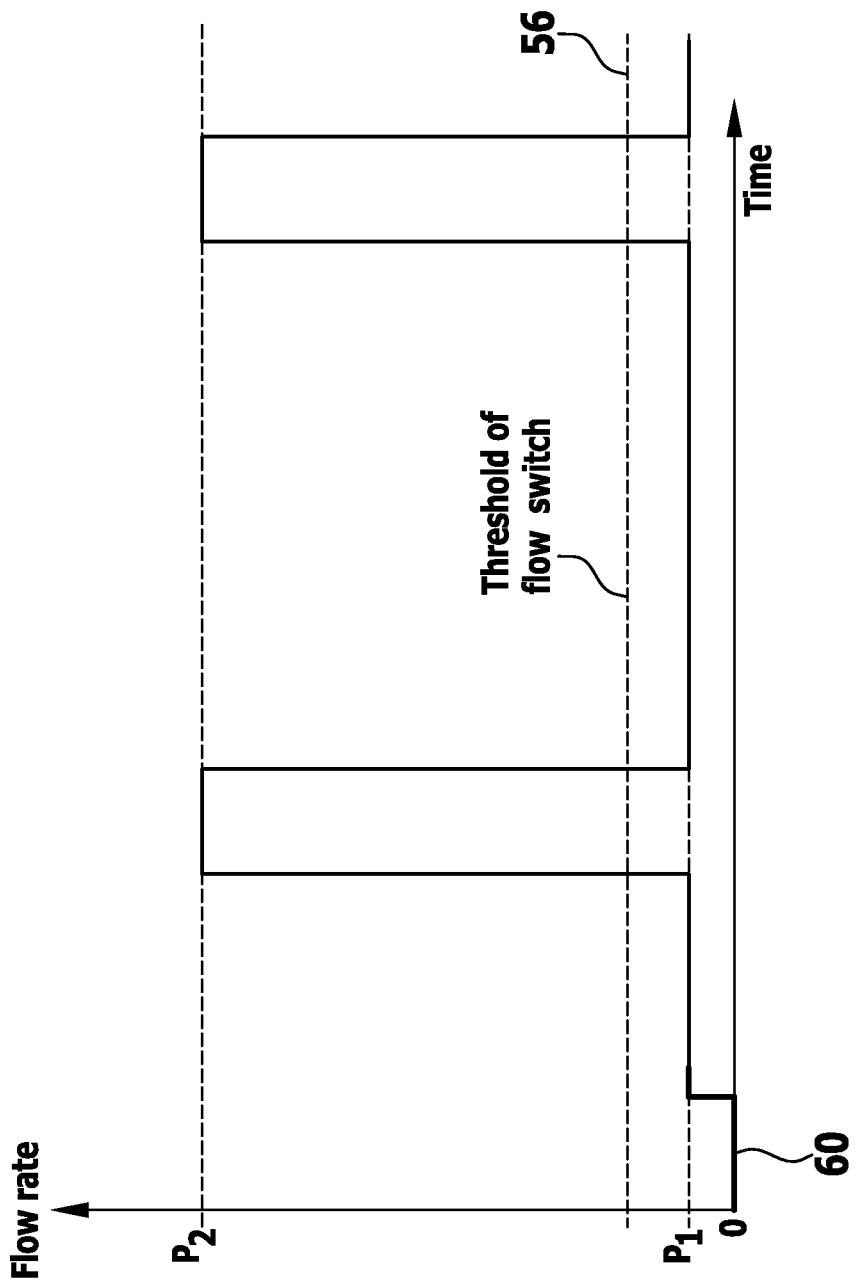

WATER DELIVERY SYSTEM AND METHOD FOR MAKING HOT WATER AVAILABLE IN A DOMESTIC HOT WATER INSTALLATION

BACKGROUND OF THE INVENTION

The present invention relates to a water delivery system.

The present invention further relates to a method for making hot water available in a domestic hot water installation.

A typical water delivery system comprises one or several faucet devices (which are usually arranged at one or several sinks), a cold water line to the faucet devices and a hot water line to the faucet devices. Hot water is heated at a heating source. In such a system the problem arises that the water "stored" in the hot water line cools down. When a hot water faucet part is opened, the running water is initially cold water and only after some time does hot water flow.

As a remedy for this problem it is well known to recirculate hot water.

U.S. Pat. No. 7,832,421 B2, which is incorporated herein, discloses a method for making hot water available in a domestic water installation, said domestic water installation comprising a source of hot water, a hot-water line and one or more tap connections for hot water connected to the hot-water line, comprising transporting water from said source of hot water through that hot-water line, during periods of non-withdrawal through that one or more tap connections, such that a temperature profile of water in the hot-water line is substantially temporally constant and varying spatially monotonically along that hot-water line, wherein the transporting step includes a substantially permanent throughput of water through the hot water line with at most periodic pause times and said pause times having a length selected to prevent cooling of water in the hot-water line.

SUMMARY OF THE INVENTION

In an embodiment of the present invention, a water delivery system is provided, comprising at least one faucet device with a cold water faucet part and a hot water faucet part, a cold water line to the at least one faucet device, a tankless heater device for heating water, a hot water line having a first portion running from an outlet of the tankless heater device to the at least one faucet device and having a second portion running from the at least one faucet device to an inlet of the tankless heater device, and a circulatory pump arranged in the second portion of the hot water line, wherein the circulatory pump has a prefixed first performance level and a prefixed second performance level, wherein the first performance level causes a finite water flow in the hot water line which is below an operation threshold value of the tankless heater device, and wherein the second performance level is higher than the first performance level and is above the operation threshold value of the tankless heater device.

The first portion of the hot water line is a hot water supply line. The second portion of the hot water line is a hot water recirculation line. With the present invention, water can be circulated at the first performance level with constant low speed. This ensures that there will be no cold bursts coming out of the hot water faucet part. Such cold bursts can be caused by in particular spatially uneven cooling of water staying in the hot water line. In particular, even if the first portion or part of the first portion of the hot water line is running in or under a concrete slab, such cold bursts are avoided. The temperature in the hot water line will vary only in a minimum manner. When switching to the second performance level, a quick reheating of water in the hot water line is brought about.

In particular, the heating operation of the tankless heater device is flow rate controlled and the operation threshold value is a threshold flow rate value. When, for example, a hot water faucet part is opened a relatively high flow rate is reached resulting in heating operation of the tankless heater device. Even when the faucet device is closed, with the present invention by switching to the second performance level, the circulatory pump can bring the tankless heater device into heating operation for reheating water in the complete hot water line at high speed.

It is advantageous if the circulatory pump has a third performance level at which the flow rate in the hot water line is substantially zero. Such, for times for which no hot water consumption is expected (like at nighttimes) water recirculation in the hot water line can be switched off.

In particular, the circulatory pump comprises a control device which switches between the first performance level and the second performance level. Such, a closed control loop can be provided.

The control device is coupled to at least one of (i) at least one sensor of the circulatory pump, and (ii) at least one sensor of the tankless heater device, wherein depending on the received signals from the at least one sensor either the first performance level or the second performance level is switched to.

In particular, the at least one sensor is a temperature sensor. Such, by measuring the temperature in the hot water line or in the tankless heater device, control signals for the circulatory pump can be gained.

In one embodiment, the circulatory pump comprises a thermostat. This thermostat can be used for deciding whether the first performance level or the second performance level is to be switched to.

In one embodiment, the control device switches operation of the circulatory pump from the first performance level to the second performance level when a temperature measured by the at least one temperature sensor is or falls under a first temperature threshold value and switches from the second performance level to the first performance level when the measured temperature is above or passes a second temperature threshold value. Such, an automatic adjustment of the water delivery system is achieved avoiding cold water bursts. The first temperature threshold and the second threshold temperature are preferably different.

It is advantageous if the second temperature threshold value is higher than the first temperature threshold value. Such, a hysteresis is provided.

In one embodiment, a timer is provided for controlling the time between switching processes. Such, especially when combined with a hysteresis of temperature thresholds, a recommended minimum running time between switching processes and/or a minimum switch-off temperature of the tankless heater device can be considered, in particular for avoiding condensation in a heat exchanger.

In one embodiment, the circulatory pump comprises an interface device for signals or data from the tankless heater device. Such, the tankless heater device can provide data and/or signals in a wired manner or wireless manner to the circulatory pump. For example, temperature signals provided from the tankless heater device to the circulatory pump can be used for switching to the first performance level or second performance level of the circulatory pump. In one embodiment, performance levels of the circulatory pump can be adjusted or set by the tankless heater device.

In particular, the tankless heater device comprises a flow meter. This flow meter is used by a corresponding control unit of the tankless heater device for switching to heating operation mode from a non-heating operation mode or vice versa.

It is advantageous when a time of the day timer is provided that is connected to or is part of the circulatory pump for setting a third performance level which is a zero flow level. Such, a timing scheme can be provided which switches off the circulatory pump completely for times for which no hot water consumption is expected (like, for nighttimes).

The tankless heater device may comprise an interface device for providing data or signals to the circulatory pump. Such, data or signals can be transferred in a wired or wireless manner from the tankless heater device to the circulatory pump.

The tankless heater device might comprise a control device for setting or adjusting at least one of the first performance level and the second performance level at the circulatory pump. Such, the value of these performance levels can be provided by the tankless heater device instead of being internal settings of the circulatory pump. Such, it is possible to adapt non-standard systems automatically. For example, non-standard systems in terms of pipe resistances can be used as water delivery systems in accordance with the invention.

In one embodiment, a flow control valve is arranged in the hot water line between the circulatory pump and the tankless heater device. This flow control valve might be used to further reduce a low performance level. If the hydraulic resistance of the corresponding lines is very low it might happen that the tankless heater device starts heating already at quite low circulating pump performances. The flow control valve allows reducing the flow rate.

In particular, the second portion of the hot water line is a recirculation line for hot water.

In a further embodiment of the invention, a method for making hot water available in a domestic hot water installation is provided, said domestic hot water installation comprising a tankless heater device, a hot water line, a cold water line, at least one faucet device connected to the cold water line and the hot water line, and a circulatory pump arranged in the hot water line. The method comprises setting a prefixed first performance level and a prefixed second performance level at the circulatory pump, wherein the first performance level causes a finite water flow in the hot water line which is below an operation threshold value of the tankless heater device and wherein the second performance level is higher than the first performance level and above the operation threshold value of the tankless heater device, switching to the first performance level of the circulatory pump for providing a low speed circulation of hot water when the temperature of the hot water in the hot water line is above a temperature threshold value, and switching to the second performance level when the temperature is below a temperature threshold value.

In particular, the temperature in the hot water line is measured at at least one of the circulatory pump and the tankless heater device.

It is advantageous when the heating operation of the tankless heater device is flow controlled and the operation threshold value is a flow rate threshold value.

The invention is described herein, by way of example only, with reference to the accompanying drawings.

BRIEF DESCRIPTION OF THE DRAWINGS

FIG. 2 is a schematic diagram showing the flow rate as a function of time for the hot water delivery system of FIG. 1.

DETAILED DESCRIPTION OF THE INVENTION

Figure 1:
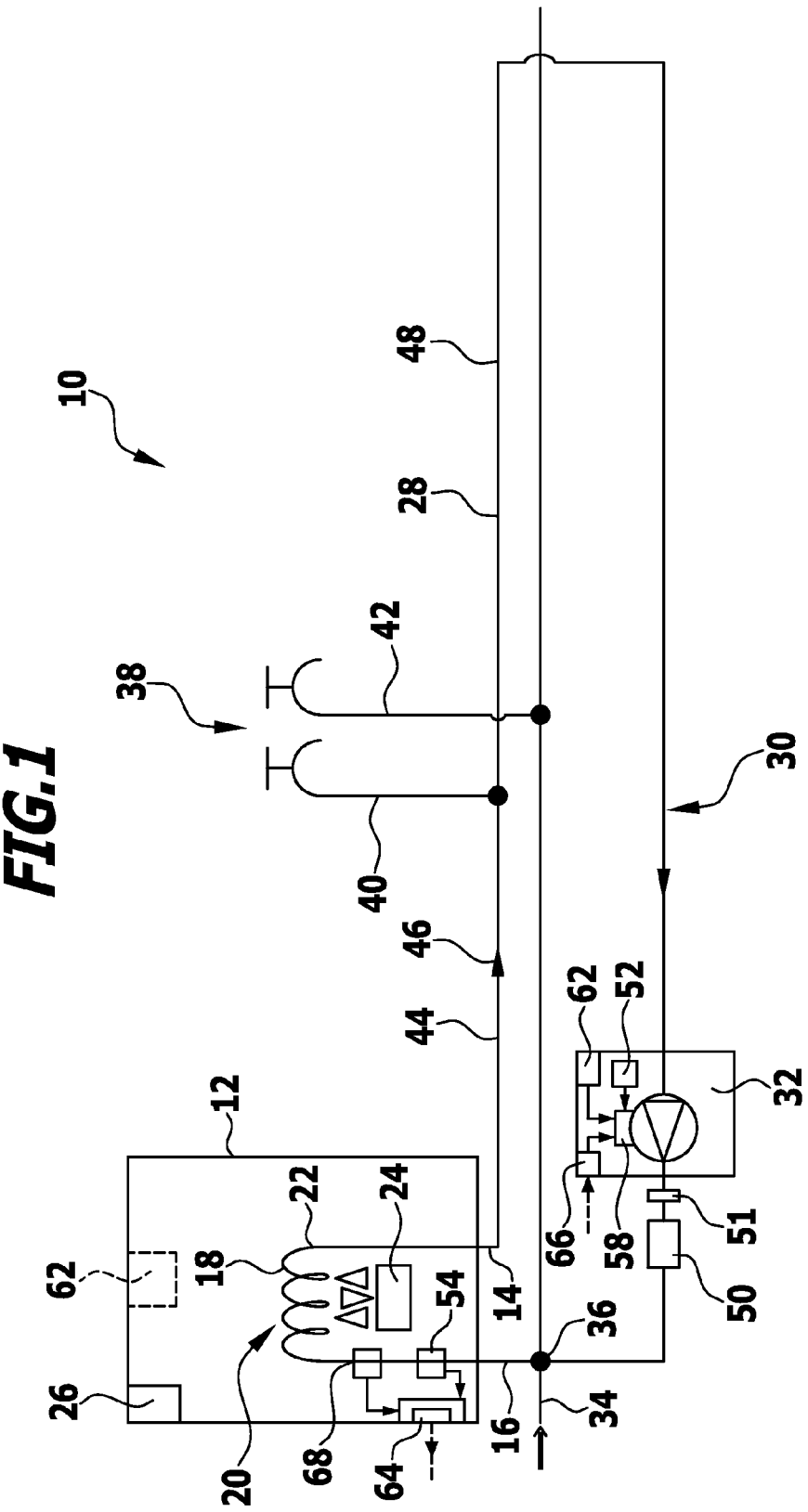
FIG. 1 is a schematic view of a hot water delivery system in accordance with an embodiment of the present invention.

A water delivery system in accordance with the present invention, which is schematically shown in FIG. 1 and designated by 10, comprises a tankless heater device 12. The tankless heater device 12 is preferably a unit which can be fixed in a domestic environment. For example, this unit can be fixed to a wall or to a floor in the domestic environment.

The tankless heater device 12 comprises an outlet 14 (for hot water) and an inlet 16. Between the inlet 16 and the outlet 14 one or more water lines 18 are arranged. Such a water line or such water lines 18 are part of a heat exchanger 20. For example, the water line or water lines 18 comprise a coil part 22. A heater 24 is arranged in proximity or at the coil part 22. In an operation mode of the tankless heater device 12, the heater 24 heats water running through the coil part 22. The heater 24 is, e.g., an electric heater arranged at the coil part 22, or a burner. A flame front of such a burner heats the coil part 22.

The tankless heater device 12 comprises a control unit 26 which controls operation of the tankless heater device 12.

The water delivery system 10 comprises (at least one) hot water line 28. This hot water line 28 is connected to the outlet 14 of the tankless heater device 12. The hot water line 28 is further connected to the inlet 16 of the tankless heater device 12. Such, the hot water line 28 provides a circulatory loop 30 in which water can circulate from the outlet 14 to the inlet 16 of the tankless heater device 12 and through the water line or water lines 18 of the tankless heater device 12.

In the hot water line 28 a circulatory pump 32 is arranged. This circulatory pump 32, when in an operating mode, drives the flow of water through the loop 30.

Further, the water delivery system comprises (at least one) cold water line 34.

In an embodiment, a connection 36 is provided between the cold water line 34 and a hot water line 28. Via the connection 36, water is provided to the hot water line system.

The water delivery system 10 comprises at least one faucet device 38. This faucet device 38 is, e.g., arranged at a sink.

The faucet device 38 has a hot water faucet part 40 and a cold water faucet part 42. The hot water faucet part 40 is connected to the hot water line 28. Via the hot water faucet part 40 hot water can be tapped. The cold water faucet part 42 is connected to the cold water line 34. Via the cold water faucet part 42 cold water can be tapped.

The hot water line 28 has a first portion 44 running between the outlet 14 of the tankless heater device 12 and the faucet device 38 or, if a plurality of faucet devices are provided, the last faucet device which has in a flow direction 46 of hot water from the tankless heater device 12 the largest distance from the outlet 14. This first portion 44 is a hot water supply line.

Further, the hot water line 28 comprises a second portion 48 which runs between the faucet device 38 (or the last faucet device 38) and the inlet 16. This second portion 48 is a recirculatory line.

The circulatory pump 32 is arranged in the second portion 48 of the hot water line 28. Namely, the circulatory pump 32 is arranged after the last faucet device 38 in the flow direction 46.

In an embodiment, a flow control valve 50 is arranged in the second portion 48 of the hot water line 28. Preferably, the flow control valve 50 is arranged between the circulatory pump 32 and the inlet 16. Between the flow control valve 50 and the circulatory pump 32 a non-return valve 51 is arranged.

In one embodiment, the circulatory pump 32 comprises a temperature sensor 52 or a thermostat with a temperature sensor. This temperature sensor 52 measures the temperature in the second portion 58 of the hot water line 28 at the circulatory pump 32. Such, a pump unit is provided comprising a pumping part and a thermostat or temperature sensor 52.

The tankless heater device 12 is arranged at a distance from the faucet device 38 (or the first faucet device 38 in the flow direction 46 after the outlet 14). Often, this distance is significant. For example, in a domestic water delivery system 10 the tankless heater device 12 is arranged in a garage and one or more faucet devices 38 are arranged in the living area or areas of a house. When the circulatory pump 32 is not operating, water does not flow in the hot water line 28. If the circulatory pump 32 is operated during non-tapping times, water can be circulated in the loop 30 driven by the circulatory pump 32.

In particular, the tankless heater device 12 is controlled by the water flow in the hot water line 28. For this, a flow meter 54 is provided. The flow meter 54 is arranged in the tankless heater device 12 in a water line 18. If water is circulated at a high enough speed (measured by the flow meter 54) the heater 24 of the tankless heater device 12 is active. The control unit 26 registers signals from the flow meter 54 and controls the heater 24.

Principally, water in the hot water line 28 is heated up to a specific temperature. If this temperature, measured by the temperature sensor 52, is reached, the circulatory pump 32 is turned off and the water in the hot water line 28 cools down again.

There can arrive the following problem, which is also called the slab problem: The first portion 44 of the hot water line 28 can be at least partially embedded in or under concrete. There, the water cools down faster than outside this region. This might result in that the temperature measured at the temperature sensor 52 indicates that a recirculation is not necessary, that is that the circulatory pump 32 has not to be operated.

If, for example, a user of the water delivery system 10 takes a shower, then the cold water that has been in the first portion 44 of the hot water line 28 will come out at the corresponding hot water faucet part 40 as a cold water burst.

U.S. Pat. No. 7,832,421 B2 describes a method to counteract the slab problem by transporting water from a hot water source with a substantially permanent throughput with at most periodic pause times and said pause times having a length selected to prevent cooling of water in the hot water line.

With a tankless heater device 12, such a method is usually not workable since hot water cannot be drawn from a hot water tank and usually the tankless heater device 12 does not work or does not work in an effective manner at very low flow rates.

In accordance with the present invention, the circulatory pump 32 comprises a fixed (preset) first performance level $P_1$ and a fixed (preset) second performance level $P_2$. The first performance level constitutes a finite low speed circulation of hot water in the loop 30. This is schematically shown in the diagram of FIG. 2. The flow rate corresponding to the first performance level $P_1$ of hot water in the loop 30 is above zero. However, this flow rate is below the threshold flow rate of the tankless heater device 12. Such, if the circulatory pump 32 is operated with the first performance level $P_1$, a permanent throughput of water in the hot water line 28 takes place but without active heating operation of the heater 24 of the tankless heater device 12.

The threshold value flow rate is shown in FIG. 2 with the reference numeral 56.

The second performance level $P_2$ is higher than the first performance level $P_1$. The corresponding flow rate is above the threshold flow rate 56. This means, when the circulatory pump 32 is operated at the second performance level $P_2$, the flow rate controlled heating of the tankless heater device 12 takes place, i.e., the heater 24 is operative and heats water going through the coil part 22.

The circulatory pump 32 comprises a control device 58 which controls operation of the circulatory pump 32 and in particular, whether the pump is operated at the first performance level $P_1$ or the second performance level $P_2$. The performance levels $P_1$ and $P_2$ are switching states of the circulatory pump 32, said switching states being controlled by the control device 58.

The circulatory pump 32 also has a third performance level $P_3$ which is a zero level. In the zero level, basically no water flow in the hot water line 28 takes place (outside tapping times). This is indicated in FIG. 2 with the reference numeral 60. Such a zero flow 60 can be provided at day times or night times when no hot water tapping is expected.

The circulatory pump 32 (or the tankless heater device 12) comprises for this a timer 62 which is a time of the day timer 62. This timer 62 is connected to the control device 58 directly (in particular, via hardware connection) if the timer 62 is part of the circulatory pump 32. If the timer 62 is part of the tankless heater device 12, it is connected to the control device 58 in a signal effective manner so that signals can be transferred to the control device 58 of the circulatory pump 32.

With the timer 62, non-operative times of the circulatory pump 32 can be preset.

In one embodiment, the control device 58 uses the temperature signals of the temperature sensor 52 to decide whether the circulatory pump 32 is to be operated at the first performance level $P_1$ or at the second performance level $P_2$ outside the zero flow regime. If the temperature measured by the temperature sensor 52 falls below a first temperature threshold value and the pump is operated at the first performance level $P_1$, it is switched to the second performance level $P_2$. As a result of that, the flow rate operated tankless heater device 12 is switched to a heating mode and the temperature of the water in the hot water line 28 rises in a quick manner.

If the temperature measured by the temperature sensor 52 reaches a second temperature threshold value, the performance level of the circulatory pump 32 is switched from $P_2$ to $P_1$ since no further heating is required. As a result, water in the hot water line 28 will cool down (until the lower temperature threshold value is reached). In an exemplary embodiment, the second temperature threshold value is higher than the first temperature threshold value so that a hysteresis is provided.

As an example, the first temperature threshold value is about 40° C. or about 100° F. and the second temperature threshold value is about 50° C. or about 120° F.

In one embodiment, a timer is provided (which can be part of the control device 58) for taking into consideration a recommended minimum running time between switching states and/or minimum a switch-off temperature of the tankless heater device 12. Such, condensation in the heater exchanger 20 can be avoided.

Instead of the temperature sensor 52, a thermostat of the circulatory pump 32 can be used for providing signals to the control device 58 to decide about switching between the performance levels $P_1$ and $P_2$.

With the present invention, the comfort level of the water delivery system 10 is improved. Outside zero flow times, the constant low speed circulation of water in the loop 30 with the circulatory pump 32 being operated at the first performance level $P_1$ ensures that there will be no cold bursts coming out of the hot water faucet parts 40; the temperature of hot water in the first portion 44, which is a hot water supply line, and in the second portion 48, which is a recirculation line, varies only at a low amount. If a switching to the higher performance level $P_2$ takes place, the water in the loop 30 is reheated in a quick manner.

In one embodiment, the tankless heater device 12 comprises an interface device 64. This interface device 64 is used for transmitting (in a wired or non-wired manner) data and/or signals to the circulatory pump 32. For receiving such data signals, the circulatory pump 32 comprises a corresponding interface device 66, which is connected in a signal effective manner to the control device 58.

For example, the tankless heater device 12 comprises a temperature sensor 68 and the temperature signals of this temperature sensor are used by the control device 58 of the circulatory pump 32 for switching between the first performance level $P_1$ and the second performance level $P_2$.

Also, the interface device 64 can be used to set the prefixed performance levels $P_1$ and $P_2$ via the tankless heater device 12. For example, a pulse width modulation speed control of the circulatory pump 32 is used. Such, an automatic adaptation to non-standard systems (in terms of water pipe resistance) can be accomplished.

The flow control valve 50 can be advantageous if the hydraulic resistance in the hot water line 28 is low. As a result, the heater 24 of the tankless heater device 12 might start heating operation already at low performance levels of the circulatory pump 32. With the flow control valve 50, the flow rate can be adapted and a lower performance level can be further reduced.

LIST OF REFERENCE NUMERALS 10 water delivery system
12 tankless heater device
14 outlet
16 inlet
18 water line
20 heat exchanger
22 coil part
24 heater
26 control unit
28 hot water line
30 circulatory loop
32 circulatory pump
34 cold water line
36 connection
38 faucet device
40 hot water faucet part
42 cold water faucet part
44 first portion
46 flow direction
48 second portion
50 flow control valve
51 non-return valve
52 temperature sensor
54 flow meter
56 threshold flow rate
58 control device
60 zero flow
62 timer
64 interface device
66 interface device
68 temperature signal

The invention claimed is:

1. Water delivery system, comprising;
at least one faucet device with a cold water faucet part and a hot water faucet part;
a cold water line to the at least one faucet device;
a tankless heater device for heating water having an inlet connected to the cold water line;
a hot water line having a first portion running from an outlet of the tankless heater device to the at least one faucet device and having a second recirculating portion running from the at least one faucet device to an inlet of the tankless heater device; and
a circulatory pump arranged in the second recirculating portion of the hot water line;
wherein the circulatory pump has a prefixed first performance level and a prefixed second performance level;
wherein the prefixed first performance level causes a first water flow rate in the hot water line which is below a flow rate threshold value for operation of the tankless heater device; and
wherein the prefixed second performance level causes a second water flow rate in the hot water line which is higher than the first water flow rate and above the flow rate threshold value of the tankless heater device.

2. Water delivery system in accordance with claim 1, wherein heating operation of the tankless heater device is flow rate controlled.

3. Water delivery system in accordance with claim 1, wherein the circulatory pump has a third performance level at which the flow rate in the hot water line is substantially zero.

4. Water delivery system in accordance with claim 1, wherein the circulatory pump comprises a control device which switches between the first performance level and the second performance level.

5. Water delivery system in accordance with claim 4, wherein the control device is coupled to at least one of (i) at least one sensor of the circulatory pump, and (ii) at least one sensor of the tankless heater device, wherein depending on the received signals from the at least one sensor either the first performance level or the second performance level is switched to.

6. Water delivery system in accordance with claim 5, wherein the at least one sensor is a temperature sensor.

7. Water delivery system in accordance with claim 5, wherein the circulatory pump comprises a thermostat.

8. Water delivery system in accordance with claim 6, wherein the control device switches from the first performance level to the second performance level when a temperature measured by the at least one temperature sensor is or falls under a first temperature threshold value and switches from the second performance level to the first performance level when the measured temperature is above or passes a second temperature threshold value.

9. Water delivery system in accordance with claim 8, wherein the second temperature threshold value is higher than the first temperature threshold value.

10. Water delivery system in accordance with claim 8, wherein a timer is provided for controlling the time between switching processes.

11. Water delivery system in accordance with claim 1, wherein the circulatory pump comprises an interface device for signals or data from the tankless heater device.

12. Water delivery system in accordance with claim 1, wherein the tankless heater device comprises a flow meter.

13. Water delivery system in accordance with claim 1, wherein a time of the day timer connected to or being part of the circulatory pump is provided for setting a third performance level which is a zero flow level.

14. Water delivery system in accordance with claim 1, wherein the tankless heater device comprises an interface device for providing data or signals to the circulatory pump.

15. Water delivery system in accordance with claim 1, wherein the tankless heater device comprises a control device for setting or adjusting at least one of the first performance level and the second performance level at the circulatory pump.

16. Water delivery system in accordance with claim 1, wherein a flow control valve is arranged in the hot water line between the circulatory pump and the tankless heater device.

17. Water delivery system in accordance with claim 1, wherein a connection between the hot water line and the cold water line is provided.

18. Water delivery system in accordance with claim 1, wherein the second portion of the hot water line is a recirculation line for hot water.

19. Method for making hot water available in a domestic hot water installation, said domestic hot water installation comprising a tankless heater device, a hot water line connected to an outlet of the tankless heater device, a cold water line connected to an inlet of the tankless heater device, at least one faucet device connected to the cold water line and the hot water line, and a circulatory pump arranged in a recirculating portion of the hot water line that runs from the at least one faucet device to an inlet of the tankless heater device, comprising:
  setting a prefixed first performance level and a prefixed second performance level at the circulatory pump, wherein the first performance level causes a first water flow rate in the hot water line which is below a flow rate threshold value of the tankless heater device and wherein the second performance level causes a second flow rate in the hot water line higher than the first flow rate and above the flow rate threshold value of the tankless heater device;
  switching to the first performance level of the circulatory pump for providing a low speed circulation of hot water when the temperature of the hot water in the hot water line is above a temperature threshold value; and
  switching to the second performance level when the temperature is below a temperature threshold value.

20. Method in accordance with claim 19, wherein the temperature in the hot water line is measured at at least one of the circulatory pump and the tankless heater device.

21. Method in accordance with claim 19, wherein heating operation of the tankless heater device is flow controlled.

* * * * *